US006283846B1

(12) United States Patent
Townsend

(10) Patent No.: US 6,283,846 B1
(45) Date of Patent: Sep. 4, 2001

(54) METHOD AND MEANS FOR MAKING SAUSAGES

(76) Inventor: Ray T. Townsend, 3131 Fleur Dr., Des Moines, IA (US) 50321

( * ) Notice: Subject to any disclaimer, the term of this patent is extended or adjusted under 35 U.S.C. 154(b) by 0 days.

(21) Appl. No.: 09/516,129

(22) Filed: Mar. 1, 2000

(51) Int. Cl.⁷ ............................. A22C 11/00; A22C 11/10
(52) U.S. Cl. ................................. 452/27; 452/46; 452/30
(58) Field of Search ................................. 452/27, 30, 46, 452/49, 50

(56) References Cited

U.S. PATENT DOCUMENTS

| | | | | |
|---|---|---|---|---|
| 3,922,364 | * | 11/1975 | Townsend | 426/413 |
| 4,818,551 | * | 4/1989 | Stall et al. | 452/27 |
| 5,019,012 | * | 5/1991 | Townsend et al. | 452/27 |
| 5,053,239 | * | 10/1991 | Vanhatalo et al. | 426/412 |
| 5,098,332 | * | 3/1992 | Handel | 452/30 |
| 5,795,605 | * | 8/1998 | Morgan | 426/277 |

* cited by examiner

*Primary Examiner*—Willis Little
(74) *Attorney, Agent, or Firm*—Zarley, McKee, Thomte, Voorhees & Sease

(57) ABSTRACT

An apparatus for applying liquid smoke to the outer surface of an extruded sausage strand has a frame with an elongated stationary outer tube thereon. A rotatable tube is concentrically mounted within the outer tube. Power components are on the frame for extruding a meat emulsion through the inner tuber while it is rotating, and for winding a strip material into a casing on the outer tube wherein the formed casing slides and rotates as it progresses down the stationary tube to receive meat emulsion from a discharge end of the inner tube. A fluid, such as liquid smoke, is introduced between the rotating casing and the rotating strand of meat, which rotate in the same direction and at the same speed to prevent any turbulence from developing in the meat emulsion. A meat strand linker creates the extruded strand into links. A conveyor takes the link strand to a heating station for cooking. The conveyor then delivers the linked and cooked strand to a peeling, cutting and packaging station located adjacent the microwave oven.

21 Claims, 9 Drawing Sheets

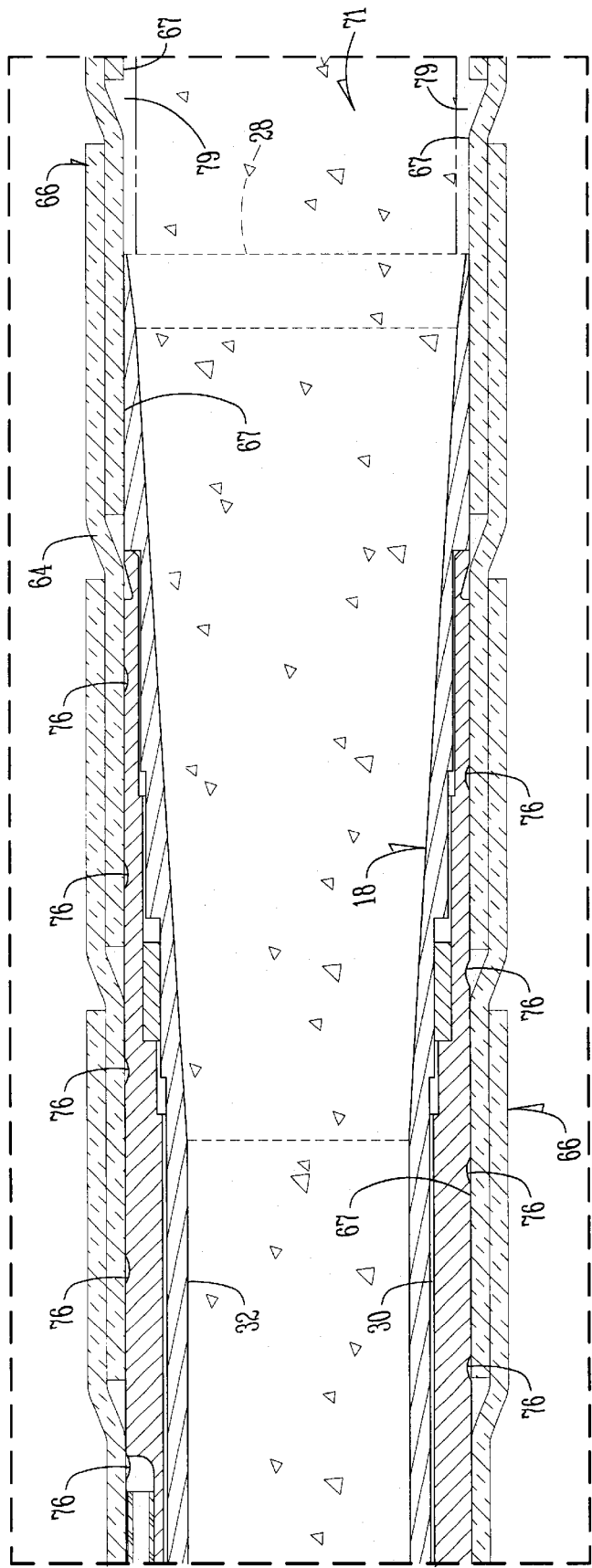
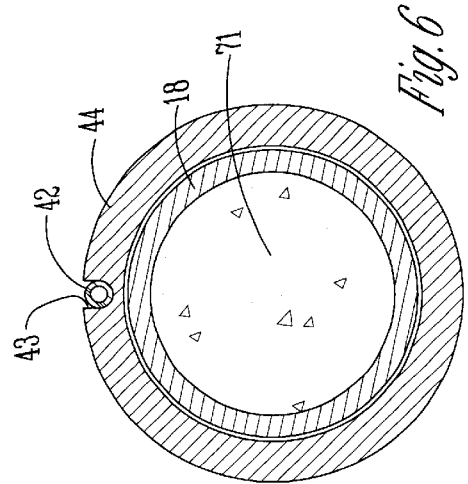
Fig. 5
Fig. 6

METHOD AND MEANS FOR MAKING SAUSAGES

BACKGROUND OF THE INVENTION

From the beginning of the sausage industry, the sausage has always been made in a casing that would facilitate osmosis. The first sausage was made from animal intestines and osmosis was used to get the smoke through the casing and onto the surface of the sausage without penetrating into the sausage. The smoke, whether liquid smoke or natural, must not be mixed through the emulsion because it causes a bitter taste. Eventually, the industry developed an artificial casing that had the qualities of osmosis, and that has been the standard for many years.

When the casing is stuffed with sausage, it is then hung in a smokehouse so that natural smoke passes through the casing by osmosis and unites with the surface only of the sausage, the chemical reaction between the smoke and protein of the sausage forms an artificial skin on the outside surface of the sausage. After processing, the original casing is discarded. Again, it is very important that the smoke does not mix with the sausage other than just at the surface of the sausage, and under the artificial casing. The artificial casing that is capable of osmosis is very expensive and yet it is used almost exclusively, other than natural casing, for making most kinds of sausage. Some attempts have been made to introduce liquid smoke to a sausage strand, but they have not been greatly successful because the liquid became mixed into the sausage. See U.S. Pat. No. 5,238,442.

When a long shirred casing is used, which is standard practice, the stuffing meat horn must be quite small in diameter in order to take the shirred casing. This means that as the casing is stuffed on a small diameter horn, the velocity of the emulsion coming out of the horn is quite great and any liquid smoke on the inside of the casing would be mixed with the meat emulsion due to the turbulence of the emulsion. This unavoidable turbulence, because of the diameter of the casing compared to the diameter of the small horn extruding the emulsion, is the principal reason why it has never been successful to put the smoke inside the surface of the casing as it is being injected with emulsion.

A further problem of existing sausage machines is that the completed linked sausages are placed in loops of several sausage links on a conveyor having a plurality of moving hooks. Enlongated sticks are then inserted through a number of loops, and the loaded stick is then transported to the smokehouse for cooking and for the introduction of smoke through the osmosis type casing material. After cooking and smoking, the sausage strand is then cut into individual links and packaged. This entire process takes time and is labor intensive.

It is therefore a principal object of this invention to provide a method and means of applying a liquid to the surface of an extruded strand of meat emulsion which will prevent the liquid from becoming intermixed with the strand of meat emulsion.

A further object of this invention is to rotate a casing and a strand of meat emulsion in the same direction and at the same velocity so that when liquid is applied therebetween as the meat emulsion is discharged into the casing, turbulence in the meat emulsion will be avoided.

A still further object of this invention is to provide a method and means of applying a liquid to the surface of an extruded strand of meat emulsion which can eliminate the use of an osmosis-type casing material.

A still further object of this invention is to use a non-osmosis casing material with liquid smoke being delivered to the surface of the sausage in the sausage making process, to permit the sausage links to be directly delivered to a microwave cooker and thence to a cutting, cooling and package machine immediately downstream from the sausage making machine to avoid use of the conventional cooking and smokehouse procedure.

These and other objects will be apparent to those skilled in the art.

SUMMARY OF THE INVENTION

A method of applying liquid, such as liquid smoke to the outer surface of an extruded sausage strand, involves locating a rotatable inner tube within a stationary outer tube; rotating an elongated casing on the stationary outer tube, and advancing the casing longitudinally over a discharge end of the inner tube; simultaneously rotating the inner tube within the outer tube and extruding a meat emulsion strand in a rotatable direction out of the discharge end to move the rotating meat emulsion into the rotating casing; and introducing a fluid material on the inside of the casing material for deposit on a strand of meat emulsion being discharged from the discharge end of the inner tube. The casing material is of the non-osmosis type. The casing and discharged meat emulsion rotate in the same direction at the same speed.

The completed sausage strand is then delivered to a conventional linker on the machine, and the completed links are then delivered to a continuous conveyor to direct the links through a cooking station. The cooked links are thereupon immediately delivered to a cutting, cooling and packaging station where they are ready for conventional delivery to commercial or retail outlets.

The apparatus for performing the foregoing method has a frame with an elongated stationary outer tube thereon. A rotatable tube is concentrically mounted within the outer tube. Power components are on the frame for extruding a meat emulsion through the inner tube while it is rotating, and for winding a strip material into a casing on the outer tube wherein the formed casing slides and rotates as it progresses down the stationary tube to receive meat emulsion from a discharge end of the inner tube. A fluid, such as liquid smoke, is introduced between the rotating casing and the rotating strand of meat, which rotate in the same direction and at the same speed to prevent any turbulence from developing in the meat emulsion. The lack of turbulence prevents the liquid smoke from becoming mixed into the meat emulsion.

A microwave or hot water cooking station is located on the machine immediately downstream from a conventional linker on the machine. A continuous conveyor extends from the linker through the cooking station and thence to a link cutting, cooling and packaging station.

BRIEF DESCRIPTION OF THE DRAWINGS

FIG. 5 is an enlarged scale sectional view taken on line 5—5 of FIG. 3;

FIG. 6 is an enlarged scale sectional view taken on line 6—6 of FIG. 3;

DESCRIPTION OF THE PREFERRED EMBODIMENT

Figure 1:
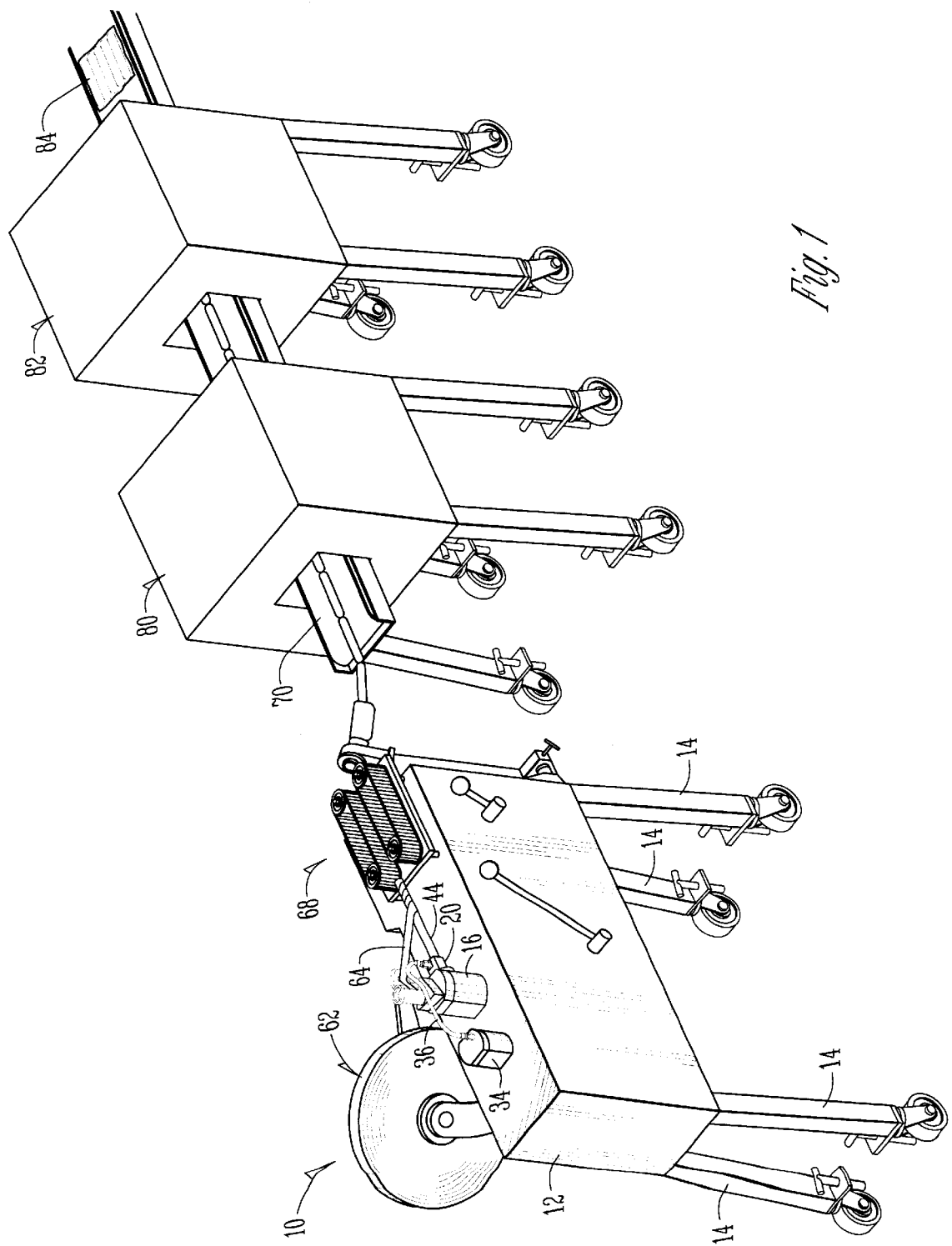
FIG. 1 is a perspective view of the machine of this invention.

The meat stuffing machine 10 has a frame body 12 with four supporting legs 14. A conventional meat emulsion pump 16 (FIG. 1) connected to a source of meat emulsion (not shown) is mounted on the top of machine 10 immediately upstream of meat stuffing horn 18 (FIG. 4). As best shown in FIG. 4, meat emulsion pump 16 has a block 20 having a meat emulsion bore 22 into which the upstream end of stuffing horn 18 is rotatably mounted. Bore 22 registers with bore 24 of block 20. The numeral 26 designates the inlet end of stuffing horn 18; 28 is the outlet end thereof (FIG. 3); 30 is the exterior surface thereof; and 32 is the interior surface (FIG. 4) thereof.

Figure 2:
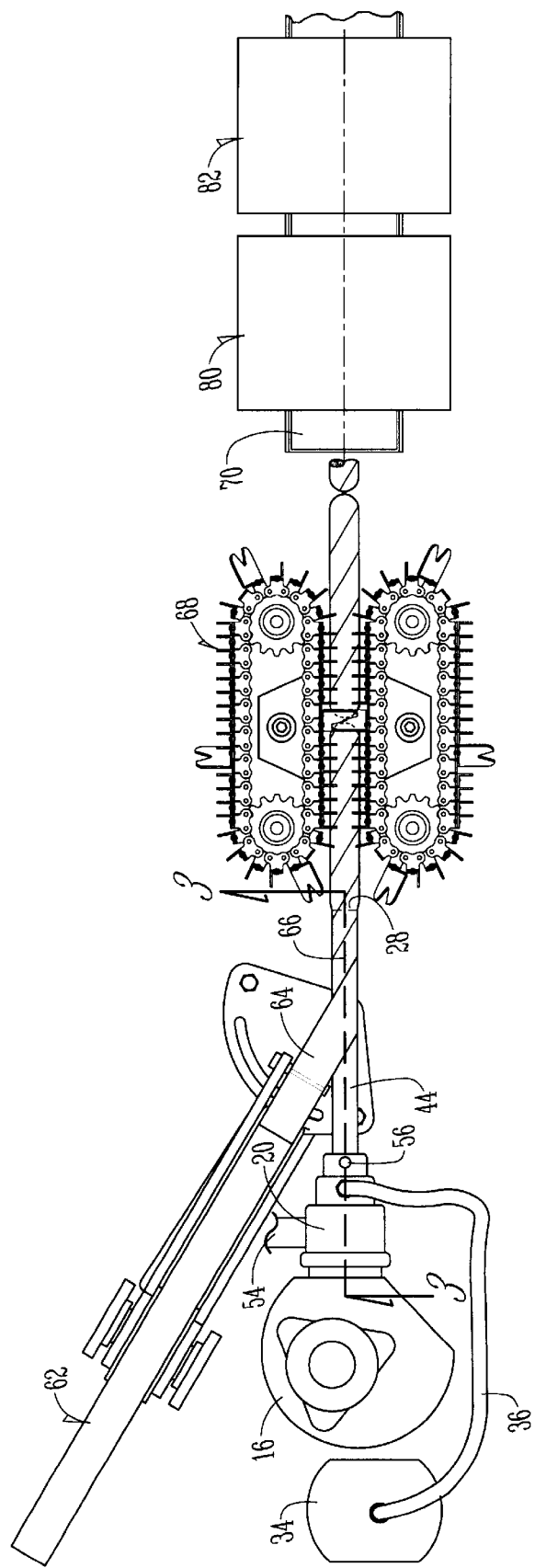
FIG. 2 is a top plan view at an enlarged scale of FIG. 1.
Figure 3:
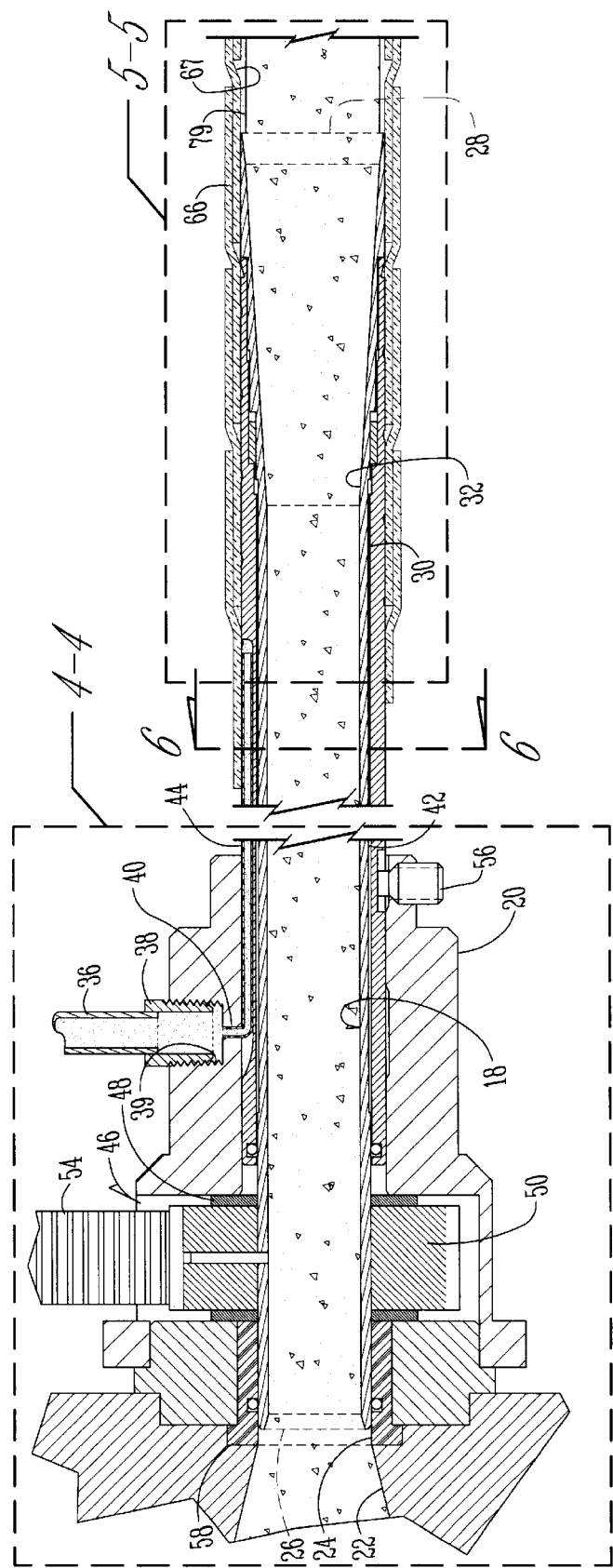
FIG. 3 is an enlarged scale longitudinal sectional view taken through the concentric inner stuffing tube and outer tube.
Figure 4:
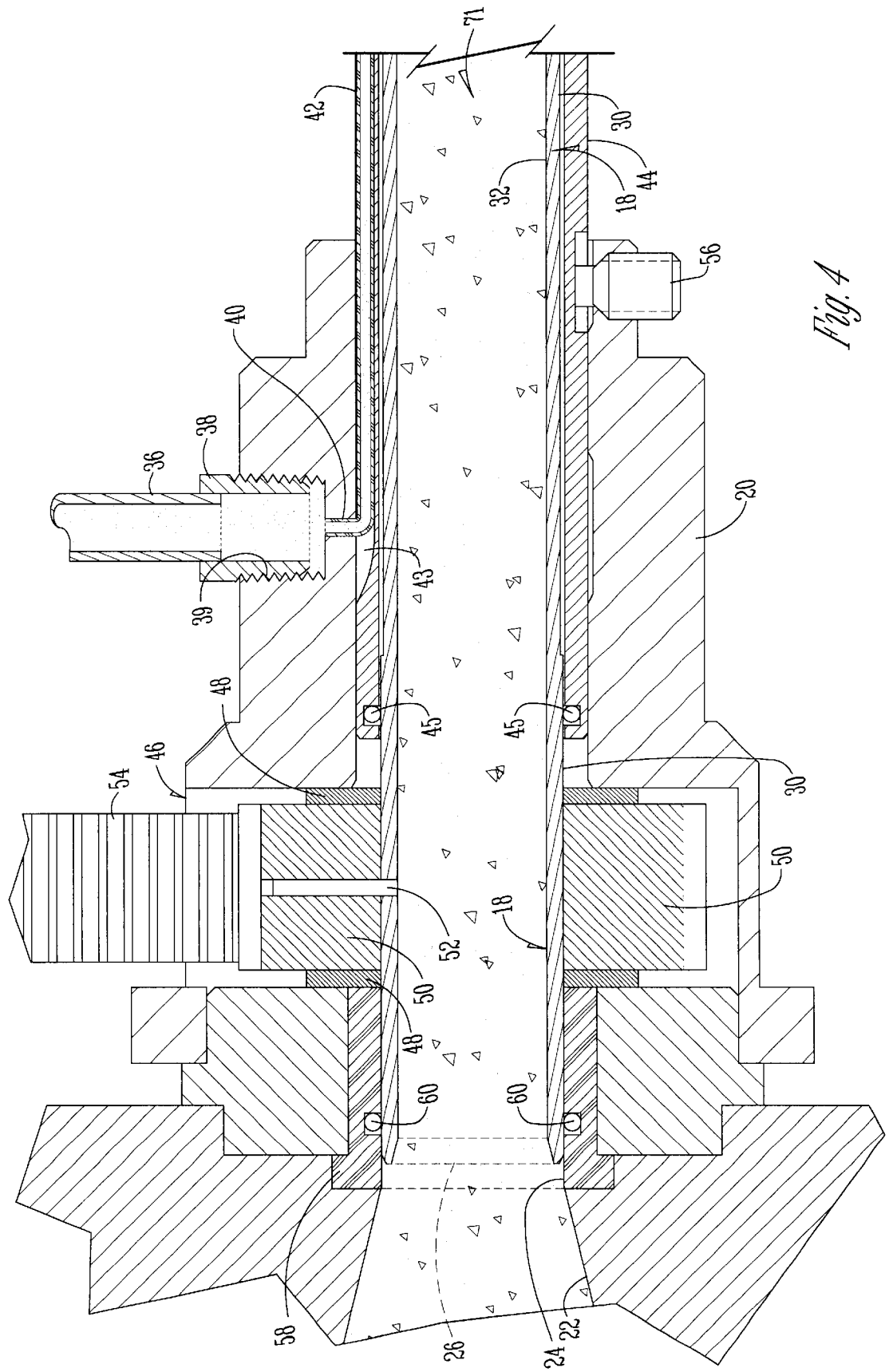
FIG. 4 is an enlarged scale sectional view taken on line 4—4 of FIG. 3.
Figure 7:
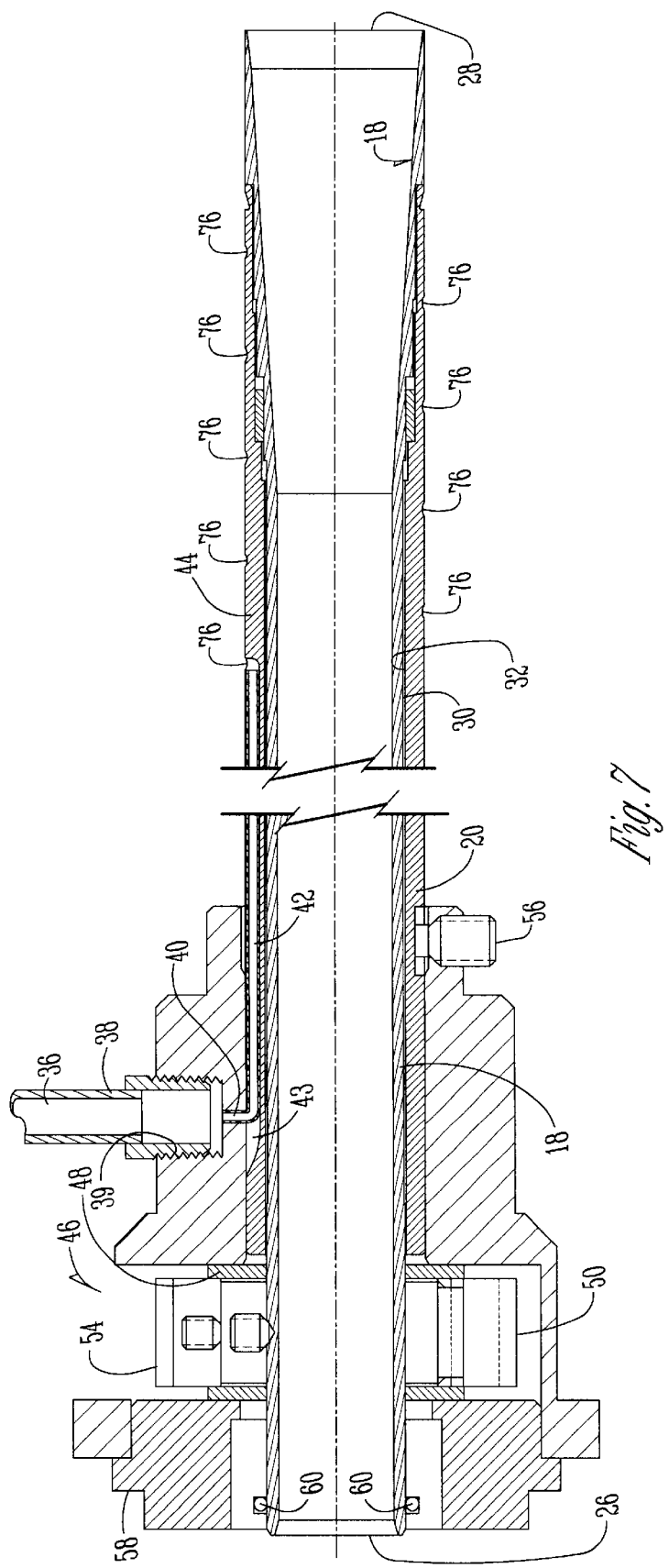
FIG. 7 is a longitudinal sectional view of the stuffing horn assembly similar to that of FIG. 3.
Figure 8:
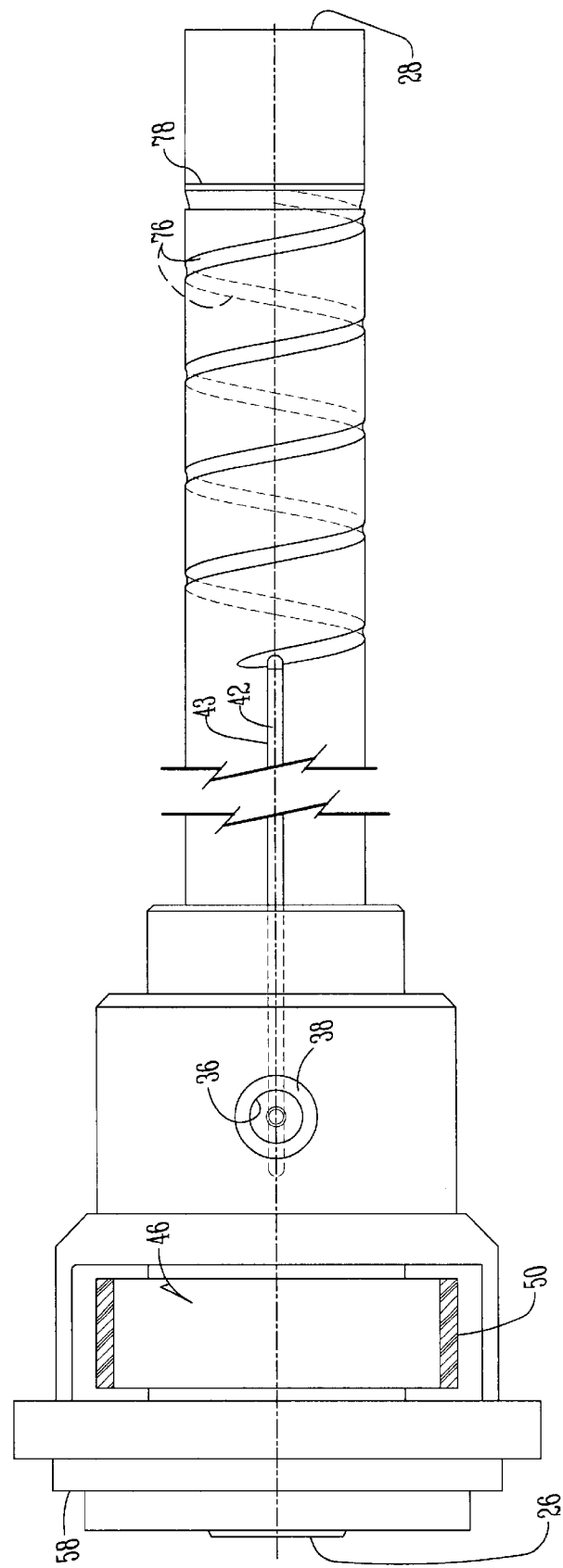
FIG. 8 is a top plan view of FIG. 7.
Figure 9:
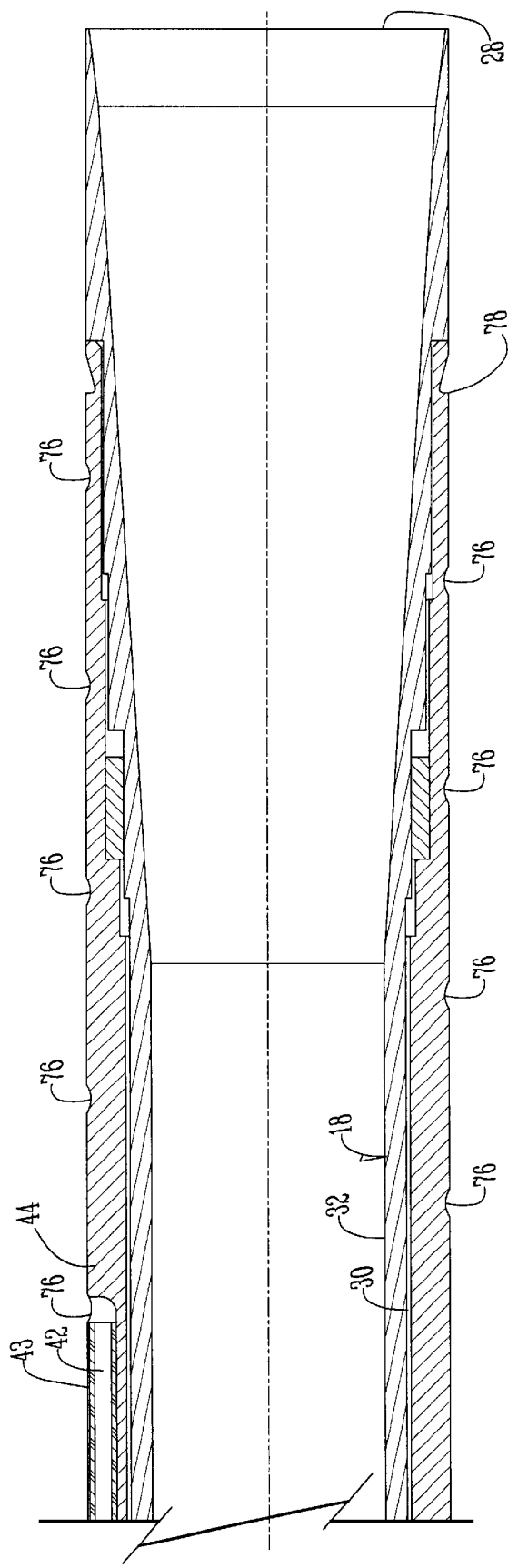
FIG. 9 is an enlarged scale partial sectional view of the right hand end of FIG. 7.

With reference to FIG. 2, a liquid pump 34 for pumping liquid smoke or the like is mounted on the top of machine 10 and is connected by conduit 36 to threaded fitting 38 which is mounted in a threaded bore 39 of block 20 (FIG. 3). Bore 39 has an outlet 40 and terminates in tube 42 dwelling in elongated groove 43 in stationary tube 44. Seals 45 form a seal between horn 18 and tube 44.

A belt opening 46 is locate in block 20. Bushings 48 extend around tube 18 on opposite sides of gear 50 which is rigidly secured to tube 18 by pin 52 (FIG. 4). Gear belt 54 extends around gear 50 and is connected to a source of rotational power (not shown). An anti-rotation screw 56 in block 20 rigidly secures stationary outer tube 44 to block 20.

A bushing 58 (FIG. 4) is located within the center bore 24, and O-ring 60 in bushing 58 extends around inner tube 18 to prevent meat emulsion from moving to the outer surface of tube 18.

A casing ribbon dispensing unit 62 (FIGS. 1 and 2) is mounted on machine 10 in any convenient manner and is adapted to dispense casing ribbon 64 to create a spiral casing 66 (FIG. 5). The spirally formed casing is created in accordance with the teachings of applicant's U.S. Pat. No. 4,727,625. The teachings of those patents insofar as the creation of the casing are incorporated hereby by reference. Essentially, the spiral casing 66 is created by causing the side edges of ribbon 64 to be frictionally secured to the adjacent side edges of a helix of the casing whereby a continuous casing member is created on the outer surface of the stuffing horn 18. Casing 66 has an interior surface 67 as shown in FIG. 5.

A conventional linking mechanism 68 is mounted on machine 10 and is adapted to conventionally twist the filled casing to create a plurality of links which are discharged from the linking mechanism onto conveyor 70 in conventional fashion. The numeral 71 designates a meat emulsion strand.

As previously described, the tube 42 dwells within the elongated groove 43 extending longitudinally in the outer surface of tube 44. The tube 42 in communication with conduit 36 to receive a supply of liquid smoke. The other end of tube 42 terminates in a spiral groove 76 extending around the outer surface of tube 44 adjacent its discharge end 78.

The conveyor 70 is to convey finished sausage links from linker 68 to microwave oven 80 and thence to cutting, peeling and packaging station 82. The oven 80 could be of the type provided by Amana Commercial & Industrial Products Division, Amana, Iowa, System QMP2103. The oven 80 and station 82 can be located in frame 12, or can be free standing.

The normal operation of this invention requires that ribbon 64 be manually wound around the exterior surface 30 of stuffing horn 18 so that a portion thereof extends beyond the outlet end 28 of stuffing horn 18.

Typically, the outward end of the casing is then tied in a closed condition so that when meat emulsion begins to enter, the casing 66 will be slidably and rotatably moved on the exterior surface of the stationary outer tube 44 and additional convolutions of ribbon 66 will be wound on the exterior surface of the tube 44 to create a continuous hollow casing 66.

At the same time, the liquid pump 34 is energized in any convenient manner to force a flow of liquid smoke or the like to conduit 36 and fitting 38, and thence through tube 42 and into spiral groove 76. The fluid then is metered out of the groove 76 (FIG. 5) onto the inner surface 67 of casing 66 to the outer surface of meat emulsion strand 71. The "layer" of fluid on the outer surface of strand 71 is designated by the numeral 79 in FIG. 5.

The ribbon 64 is dispensed by unit 62 by any suitable speed control means (not shown) in such a manner that it is being rotated (and slidably moved) on the outer surface of stationary outer tube 44 at a rotational speed substantially the same as that of inner tube 18. The casing 66 formed by ribbon 64 is also rotated at approximately the same speed as inner tube 18 so that the meat emulsion strand 71 leaving end 28 of tube 18 (FIG. 5) and casing 66 are rotating in the same direction at the same speed. This phenomenon tends to substantially reduce if not eliminate any turbulence in the meat emulsion strand 71 to minimize if not eliminate any mixture of the layer of fluid 79 (of liquid smoke—FIG. 5) into the body of the strand. As a result, the extruded strand 71 has only a thin layer of fluid 79 on its outer surface thereof without the fluid being mixed into the body of the strand. The casing 66 can therefore be comprised of a flexible solid plastic material which does not have or need the osmosis capability, because liquid or natural smoke will not ever need to be imposed on the surface of strand 71 from the outside of casing 66 through the material of the casing. The linked strand 71 is then delivered to linker 68 and thence through the microwave oven or station 80 and thence to cutting, peeling and packaging station 82 which creates finished sausage package 84.

The microwave oven 80 should heat the strand 71 to a temperature of just over 160° F., (usually 162° F.). Depending on the length of the oven 80, the strand could be in the oven for as little as 15 seconds.

It should be noted that the oven 80 and station 82 could possibly handle the sausage output of two or three machines.

Figure 10:
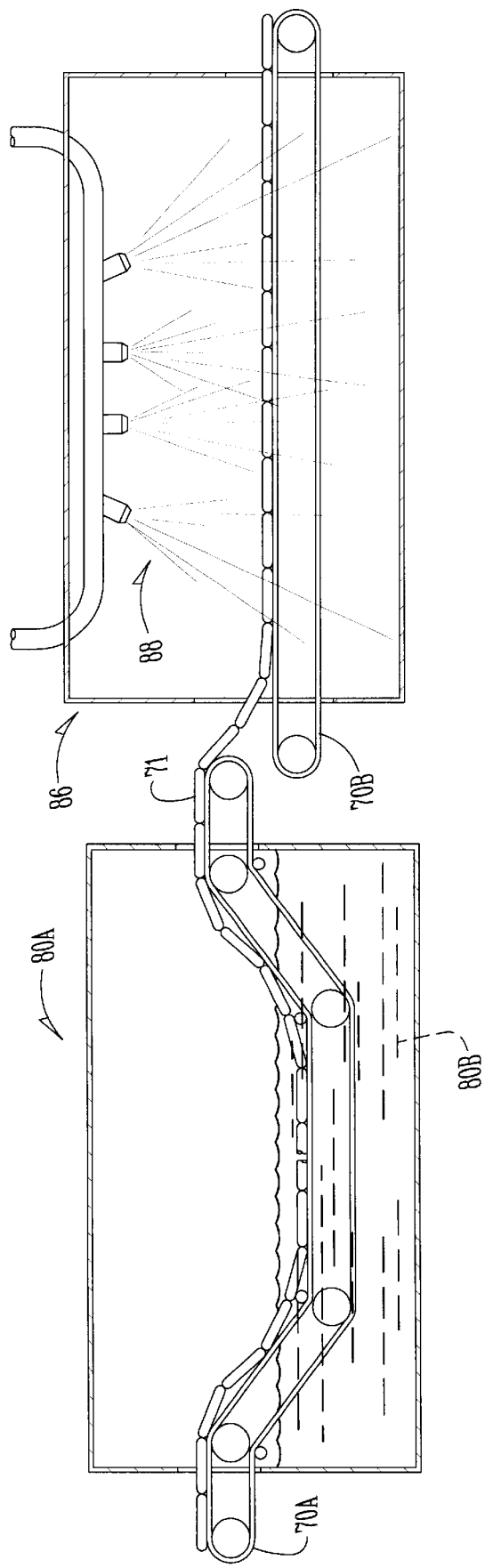
FIG. 10 is an alternate form of the invention, using a hot water cooking station.

FIG. 10 shows an alternate form of the invention where a hot water cooking station 80A is used in lieu of the microwave cooking station 80. The conveyor 70A carries the linked sausage strand 71 through a bath of water 80B heated to approximately 180° F. so that the travel of the strand 71 through the bath of water will be heated to approximately 162° F. as was done within the microwave cooking station 80. A cooling station 86 including a cold water spray 88 or the like and conveyor 70B is located just downstream of the station 80A to cool the strand 71 before entering the packaging station 82. The cooling station can also be used in conjunction with the microwave cooking station 80.

From the foregoing, it is seen that the invention will achieve at least all of its stated objectives.

What is claimed is:

1. A method of making sausage, comprising, extruding a meat emulsion from a tube into a tubular casing while at the same time depositing liquid smoke on an outer surface of the meat emulsion within the tubular casing to create an encased sausage strand, linking the encased sausage strand into a linking mechanism to divide the strand into a plurality of sausage links to create an elongated linked encased sausage strand, and heating the elongated linked encased sausage strand as it exits the linking mechanism to a sufficient temperature to eradicate any bacteria in the meat emulsion.

2. The method of claim 1 wherein the heating is caused by exposing the elongated linked encased sausage to microwave heating.

3. The method of claim 1 wherein a plurality of the elongated linked encased strands are moved adjacent each other and are heated simultaneously.

4. The method of claim 1 wherein the sausage strand is heated to at least 160° F.

5. The method of claim 1 wherein the strand is peeled of its casing, cut into separate links, and packaged at a station adjacent the location where the strand is heated.

6. The method of claim 1 wherein the heating is caused by passing the elongated linked encased sausage through a heated body of fluid to heat the sausage to at least 160° F.

7. A machine for making sausage, comprising, a frame, a meat emulsion pump on the frame.

a meat extrusion tube connected to the pump and having a discharge end, a casing material on the extrusion tube extending over the discharge end of the extrusion tube to be progressively filled with meat emulsion, means for placing liquid smoke on the surface of the meat emulsion before the meat emulsion is extruded into the casing, a linker on the machine for linking the encased sausage strand into a linking mechanism to divide the strand into a plurality of sausage links to create an elongated linked encased sausage strand, a heating mechanism on the machine directly downstream from the linker for heating the elongated linked encased sausage strand as it exits the linking mechanism to a sufficient temperature to eradicate any bacteria in the meat emulsion.

8. An apparatus for applying a layer of liquid to the outer surface of an extruded sausage strand, comprising, a frame, an elongated stationary tube on said frame, an elongated rotatable tube having a discharge end rotatably mounted within said stationary tube, first power means on said frame for rotating said inner tube and for extruding meat emulsion through said inner tube through said discharge end, second means on said frame for rotating an elongated casing on said stationary tube and longitudinally advancing an elongated casing over the discharge end of said inner tube to receive a rotating strand of meat emulsion, and means on said frame for introducing a fluid material on the inside of a casing on said stationary tube for deposit on a strand of meat emulsion being discharged from said inner tube.

9. The device of claim 8 wherein said first and second power means rotate a casing on said stationary tube and said inner tube in the same direction.

10. The device of claim 8 wherein said first and second power means rotate a casing on said stationary tube and said inner tube in the same direction at the same velocity.

11. The device of claim 8 wherein an elongated hollow casing is on said outer sleeve and is comprised of a non-osmosis material.

12. The device of claim 8 wherein a peeling, sausage link cutting, and sausage packaging station is positioned downstream from the heating mechanism.

13. The device of claim 8 wherein the heating mechanism is a microwave oven.

14. The device of claim 8 wherein a conveyor delivers the sausage strand to the heating mechanism from the linker.

15. The device of claim 7 wherein the heating mechanism is a microwave oven.

16. The device of claim 7 wherein the heating mechanism is a heated bath of water, and a conveyor in the bath of water for moving the encased sausage therethrough.

17. A device for encasing sausages, comprising, a frame, extrusion means on the frame for extruding a strand of sausage into an elongated hollow casing made from a single casing strand of non-osmosis material, means for depositing liquid smoke on an outer surface of the strand within the hollow casing before meat emulsion is extruded into the hollow casing, linking means on the frame for linking the strand of sausage after it is encased, and a cooking station associated with the frame adjacent the linking means to receive and cook the linked strand of sausage.

18. The device of claim 17 wherein the cooking station has a bath of heated water through which the linked strand can be moved.

19. The device of claim 17 wherein the cooking station is a microwave oven.

20. The device of claim 17 wherein a cooling station is located downstream of the cooking station.

21. The device of claim 17 wherein a cutting, cooling and packaging station is located downstream of the cooking station.

* * * * *